March 17, 1942. A. J. GOLDSMITH 2,276,958
TAPING MACHINE FOR THE MANUFACTURE OF CORRUGATED BOXES
Filed May 3, 1940
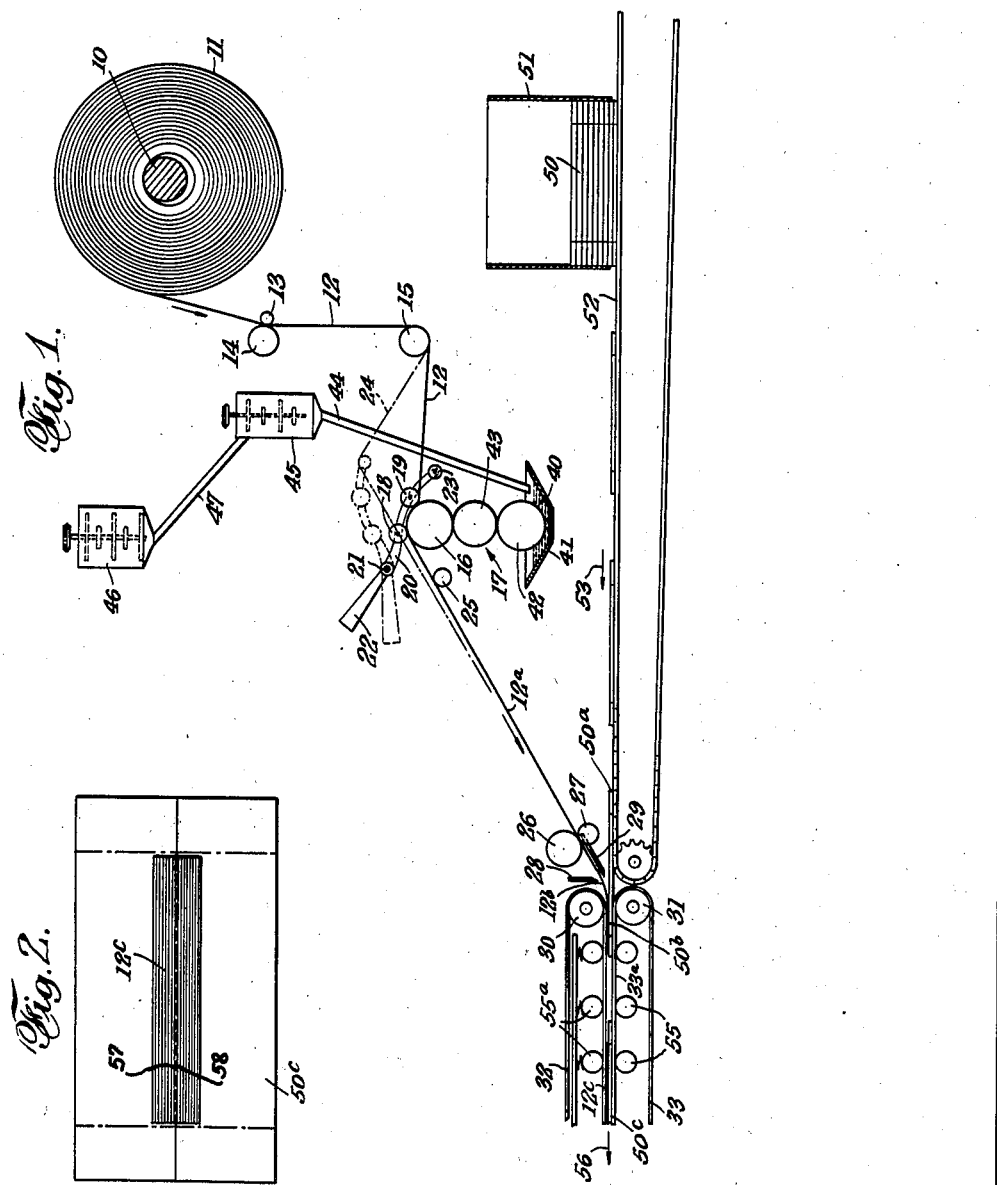
INVENTOR
ALBERT J. GOLDSMITH
BY Patented Mar. 17, 1942

2,276,958

UNITED STATES PATENT OFFICE 2,276,958

TAPING MACHINE FOR THE MANUFACTURE OF CORRUGATED BOXES

Albert J. Goldsmith, Kew Gardens, N. Y.

Application May 3, 1940, Serial No. 333,198

1 Claim. (Cl. 93—56)

The invention relates to a taping process and means for carrying out said process for use in connection with the manufacture of corrugated boxes.

Heretofore, gummed tape had been prepared in rolls, the gum or adhesive thereof being in a dry state was moistened by passing the tape over a water carrying roll. The tape was then cut off and applied or pressed unto the article, such as a paper corrugated box or similar product. Among the disadvantages resulting from utilizing an already finished adhesive tape from a roll may be mentioned the effect of weather conditions on the adhesive in making the same sticky and causing the layers of the rolls to adhere to each other, thus preventing an efficient use of the gummed tape in ordinary tape-machines; the effect of low temperature upon the adhesive which interferes with the ready dissolving of the adhesive with water, thereby preventing the tape from being adhesively united with the article and later coming off the latter. Furthermore, the conventional adhesive tape roll could not be employed for all desired purposes since the adhesive would not always function for the purpose intended, namely, to provide intimate adhesive or bond between the tape and the article because of the nature of the material from which the article is made.

The above-mentioned and other disadvantages are overcome by the present invention which makes provision for ungummed tape being passed over a gumming roll carrying warm and dissolved gum or adhesive, whereby the said adhesive is applied to the tape passed immediately to the article being worked upon. By this process, a very high bond of adhesion is gained because the adhesive preferably selected in accordance with the nature of the material of said article, is fully dissolved and may be still warm, while the adhesive is being applied to said tape and said article. Consequently, the weather conditions have no influence on this process of taping.

By employing the taping process according to the invention any kind of gum or combining glue may be used, while in the heretofore known taping process a relatively expensive and high test gum had to be utilized. Furthermore, in the heretofore used process it was necessary to change the consistency or viscosity of the adhesive for the different seasons in the year. Through the process employed in accordance to this invention production may be speeded up, difficulties regarding the rapidity and quality of sticking effect irrespective of weather conditions are eliminated and manufacturing cost of the finished article is reduced considerably because of the economy in saving of adhesive and avoiding the use of auxiliary devices for drying the gummed tape and for moistening said gummed tape when making ready the same for use.

It is, therefore, an object of the present invention to provide means for preparing a tape, coming from a roll of tape with an adhesive in a viscous state just prior to the application of said tape to the article to be bound or reinforced by the latter.

It is another object of the invention to provide means for conducting said adhesive to the tape prior to the latter being applied to the article to be equipped therewith.

It is a further object of the present invention to provide a glutinous binding layer intimately uniting the said tape with the article to be worked on without the necessity of premoistening the adhesive carried by the tape before its application.

It is still another object of the present invention to apply an adhesive carrying tape to an article while the adhesive is in a substantially warm glutinous condition.

These and other objects and advantages of the invention will appear from the following disclosure thereof together with the attached drawing which illustrate a certain form of embodiment thereof. This form is shown for the purpose of illustrating the invention since the same has been found in practice to give satisfactory and reliable results, although it is to be understood that the various parts of which the invention consists, can be variously arranged and organized and that the invention is not limited to the precise arrangement and organization of the instrumentalities as herein shown and described.

In the drawing:

Fig. 1 is a schematic arrangement in longitudinal section embodying the invention.

Fig. 2 is a top plan view of an article made in accordance with the invention.

Referring now to the drawing which shows schematically and in longitudinal section an arrangement embodying the invention, there is provided a mandrel 10 upon which is mounted a roll 11 of ungummed tape 12. The ungummed tape is preferably passed between two pull rollers 13, 14 which also guide the tape 12. The tape is trained over an idler roller 15 and then held against gumming roller 16 of the gumming device 17 by means of two pressure rollers 18, 19 mounted on an arm 20 pivoted at 21 to a fixed support (not shown). Arm 20 has an extension 22 against which sufficient pressure is applied to cause rollers 18, 19 to bear against tape 12 at its location on roller 16. Arm 20 is further provided with a lifting roller 23 at its forward end to selectively engage and lift the tape 12 from roller 16 into the dot and dash position indicated by numeral 24, when desired. A smoothing roller 25 is provided beyond gumming device 17 and over which passes tape 12 after it has been applied with the gum or similar adhesive, to smooth out uniformly the adhesive on the underside of the tape. The tape further passes between two pull rollers 26, 27 and between the blades or knife means 28, 29 of a cutting device (not shown) and then between the pressure rollers 30, 31 over which are trained the bands 32, 33, respectively.

The gum or other adhesive 40 in viscous or liquid form is contained in a pan 41 into which projects roller 42. Between roller 42 and gumming roller 16 and in contact with both said rollers is located the intermediate roller 43. The adhesive material 40 is transferred from pan 41 to roller 16 through said rollers 42 and 43 in a well-known manner. The adhesive 40 is supplied to pan 41 through conduit 44 connecting with a secondary mixer 45. Above said mixer 45 is located the prime mixer 46 connecting with said mixer 45 through conduit 47. Mixer 45 and 46 are of conventional construction. Mixer 46 mixes the dry gum, for instance, with a solvent and heats the same, making it ready for use. The dissolved gum is then transmitted through pipe or conduit 47 to storing mixer 45. The gum mixture is kept in mixer 45 at a predetermined temperature (by any suitable heating means, not shown) and is then transported through conduit 44 to the pan 41 in sufficient quantity required for coating a certain length and width of tape. Pan 41 as well as roller 16 and/or 17 may also be heated by any appropriate heating means (not shown).

The articles, for instance, collapsed boxes 50 of corrugated material are stacked in container or hopper 51 and are conveyed therefrom over transporting band 52 in the direction of arrow 53 to the upper portion 33a of transporting band 33 and between rollers 30, 31.

The mechanisms for driving bands 52, 33 and 32 are well known in the art.

The collapsed box 50a is positioned partly on conveyer belt 52 and partly on conveyer band 33a and is being pulled by rollers 30, 31. Tape 12a having the adhesive coating in a liquid and preferably warm state thereon is being adhesively united to the corrugated box 50a at 50b by coaction of pressure rollers 30, 31. After the tape has been united to the box 50a substantially along the whole length of contiguous free ends to close said box, knife means or blades 28, 29 are put in operation by any known driving means, severing tape strip portion 12b from the tape 12a at a predetermined moment during the intermittent stopping of the driving mechanism for conveyer belts 32, 33. After the cutting operation box 50a continues in its movement between conveyer rollers 55, 55a. As illustrated in the drawing, box 50c (a fragment thereof has only been shown) is pressed and held with the applied tape strip 12c between rollers 55, 55a which also longitudinally transport the complete box in the direction of arrow 56 to a desired place.

The boxes are continuously transported in collapsed condition on conveyer belt 52 and in spaced relation so that as the tape 12a is being cut the preceding box will approach the conveyer belt portion 33a.

During the tape cutting operation the tape 12a received with a portion thereof by the box for nearly the whole length thereof is thus fixed thereon in position and held firmly, while blade 28 moves relatively to blade 29 for performing the cutting of said tape 12a.

It is well understood that the arrangement herein described is driven by any suitable means and that the rollers and mandrel are mounted on a frame work as it is customary in the art.

Fig. 2 shows the collapsed box 50c with the tape strip 12c adhesively united thereto along contiguous free edges 57, 78 thereof.

However, it is obvious that the process above disclosed may also be used for reinforcing contiguous portions or fold lines of boxes and the like.

From the foregoing description taken in connection with the accompanying drawing, the advantages of the means for carrying out the process and article derived therefrom will be readily understood by those skilled in the art to which the invention pertains; and while I have outlined a preferred machine which I may consider to be the best embodiment thereof, I desire to have it understood that the means described is merely illustrative and that such changes may be made as are within the scope of the appended claim.

Having thus described the invention, what is claimed as new and desired to be secured by Letters Patent, is:

In a machine for uniting a pair of contiguous free ends of a corrugated box in collapsed condition by means of a tape; means for continuously feeding from a tape roll said tape to said free ends of said box, a pressure device including a receptacle containing an adhesive in a warm state, swingable pressure rollers engageable with said device and oppositely positioned thereto, said pressure rollers being adapted to selectively engage said tape at said pressure device whereby said adhesive may be applied to a face of said tape, means for smoothing said adhesive on said tape and for forwardly moving a portion of said tape provided with said adhesive to said ends for deposit thereon, and knife means for severing said portion from the remainder of said tape.

ALBERT J. GOLDSMITH.